United States Patent [19]
Bridge

[11] Patent Number: 4,606,298
[45] Date of Patent: Aug. 19, 1986

[54] COMBINATION BIRD FEEDER AND SHELTER

[75] Inventor: Ian N. Bridge, Beckbury, England

[73] Assignee: Silverthorne-Gillot Limited, Dudley, England

[21] Appl. No.: 692,221

[22] Filed: Jan. 17, 1985

[51] Int. Cl.⁴ .............................................. A01K 39/00
[52] U.S. Cl. .................................................. 119/51 R
[58] Field of Search ................ 119/51 R, 52 R, 23, 119/26

[56] References Cited

U.S. PATENT DOCUMENTS

| | | | |
|---|---|---|---|
| 992,167 | 5/1911 | Cousin | 119/26 |
| 2,151,010 | 3/1939 | Copeman | 119/51 R |
| 3,602,196 | 8/1971 | Tucci | 119/51 R |
| 3,977,363 | 8/1976 | Fisher, Jr. | 119/51 R |
| 4,104,987 | 8/1978 | Winston | 119/51 R |

Primary Examiner—Jay N. Eskovitz
Attorney, Agent, or Firm—C. O. Marshall, Jr.

[57] ABSTRACT

A disposable bird feeder comprises a blister pack of bird food adapted to be suspended by an eye in the backing and to provide a perch for the bird by means formed out of the pack and backing as shown in FIG. 1. This provides a very cheap and disposable bird feeder.

3 Claims, 6 Drawing Figures

COMBINATION BIRD FEEDER AND SHELTER

This invention relates to bird feeders. It is known to provide structures of varying degrees of elaboration for the purpose of feeding wild birds and in particular attracting them to the garden to feed, so that they can be observed.

The object of the present invention is to provide an improved bird feeder which is particularly cheap and economical.

According to the invention a disposable pack is intended for use once only and is at least part-filled with bird food, and forms the bird feeder itself without (or with only a minimum) of associated apparatus, said pack comprising a container containing the food, at least one access port for the beak of the bird, closure means preventing loss of food through the port in storage and transit, means for suspending or supporting the feeder in its place of use, and a perch located or locatable adjacent the port.

Preferably the pack also provides shelter for a bird on the perch.

Various embodiments of the invention will now be more particularly described with reference to the accompanying drawings wherein:

FIG. 1 is a perspective view of a first embodiment;

FIG. 2 is a fragmentary front elevation of the same in a position different to that shown in FIG. 1; and FIGS. 3 and 4 are respectively sections taken on the lines 3—3 and 4—4 of FIG. 2;

Both of the embodiments herein describe use of containers which comprise a generally dish-shaped vacuum-formed transparent plastics sheet, commonly known as a "blister pack". Such blister pack is convenient for its transparency, in giving a ready indication of the volume of contents remaining, as well as being cheap to manufacture and weather resistant. However, packaging materials other than blister packs may also be suitable as will be better understood after consideration of the following description.

Figure 1:
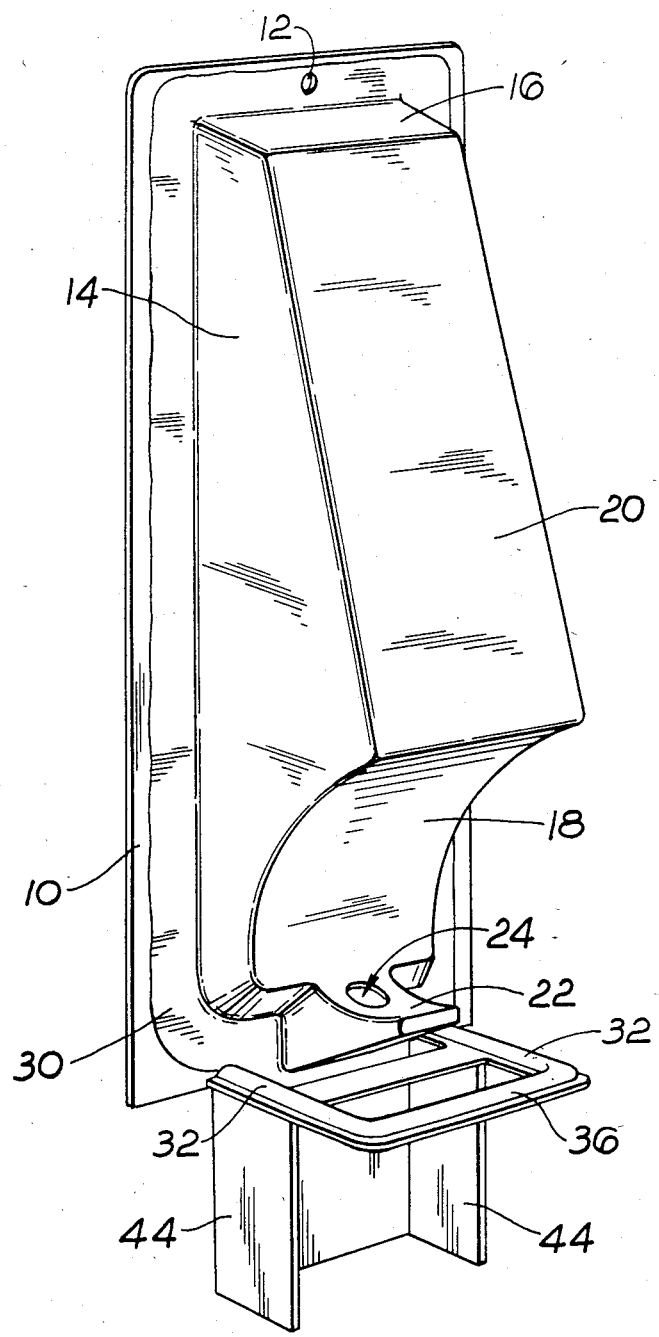

Referring first to FIG. 1, the disposable bird feeder/bird food pack is shown herein in its position ready for use. It comprises a generally rectangular card or like backing 10 apertured at 12 so that it can be hung with a string from a tree branch, or nailed to a fence. The blister pack forms a tray which is closed by the card, the pack having side walls 14, top and bottom walls 16, 18 and a front wall 20. The wall 20 is inclined at an angle to the card 10 and the wall 18 forms a shelter surface for a bird located below it.

The blister pack is formed with an integral projection 22 which is hollow and extends outwardly under the sheltering wall 18 with a generally central access port 24. The port can be covered by a strip of adhesive tape in transport and storage, or the port 24 can be punched in the projection when the bird feeder is to be brought into use but the punch location can be indicated for example by a printed line or an attached label prior to that.

Figure 4:
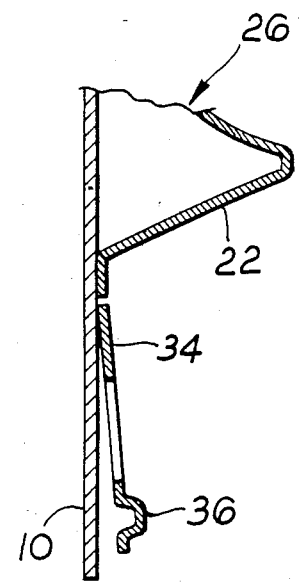

It will be seen that when the feeder is hung from the hole 12, food in the blister pack will fall through the projection 22 so as to be accessible through the port 24, but because of the relatively small dimensions—typically the projection 22 has a vertical dimension at the card of about 2 cm, the food will tend to wedge at the base of the container provided by the blister pack so that when it is not being taken by birds it will not tend to spill out at the port 24. FIG. 4 shows the projection in section and the arrow 26 indicates the approximate position of the said port.

Figure 2:
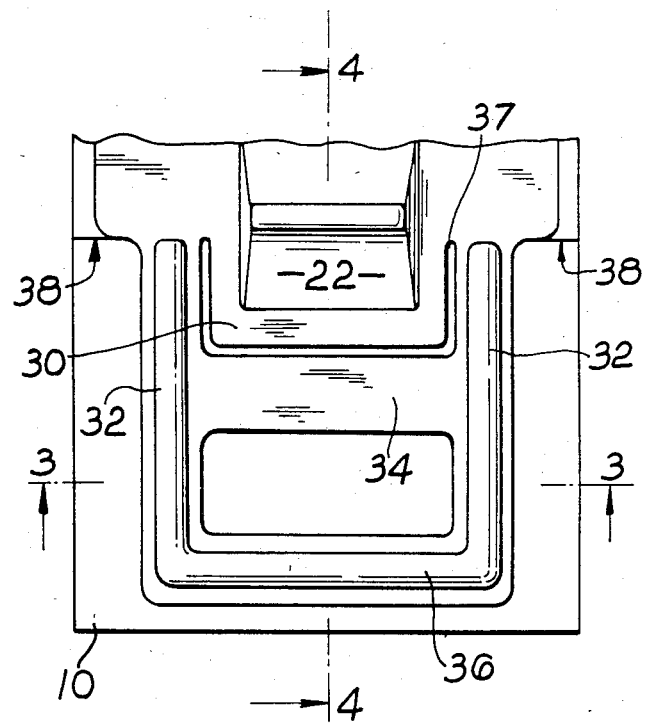

The perch is made as an extension of the blister pack and is initially (in storage and transit) located generally in the plane of the peripheral flange 30 of the blister pack which is adhered to the card 10. As best seen in FIG. 2, the flange 30 continues around the entire periphery of the food containing portion of the pack, and the perch comprises a pair of side members or stiles 32 connected by a pair of rungs 34,36. In practice it is anticipated to be necessary to provide only a cut 37 (FIG. 2) separating the flange 30 from the adjacent portions of the stiles and rung 32, 34, although this cut is exaggerated in width in FIG. 2 in the interest of clarity.

Figure 3:
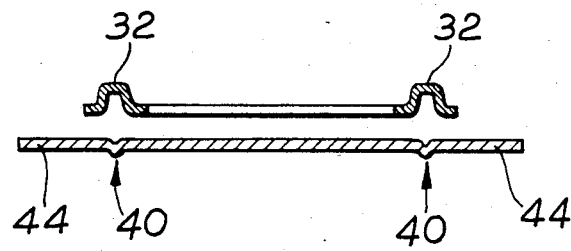

The stiles 32 and the rung 36 are generally of channel section to increase the rigidity of the perch as best seen in FIGS. 3 and 4. The rung 34 could be similarly reinforced.

The perch is intended to be folded from the position generally co-planar with the card 10 to a position at right angles thereto as shown in FIG. 1 so that it is below the shelter surface 18 and a bird perched on it has easy access to the port 24. To support the perch in that position, the card backing 10 is cut transversely at 38, on each side of the projection 22 and is creased along lines 40 extending from the cuts 38 generally lengthwise of the stiles 32, so that wing-like portions of the card 44 can be folded up at right angles with their top edges engaged in the channel section parts of the stiles 32. This also serves the purpose of preventing the cardboard returning to the position wholly co-planar with the rest of the portion 10, allowing the perch to fold back to the FIG. 4 position from the FIG. 1 position.

Figures 5, 6:
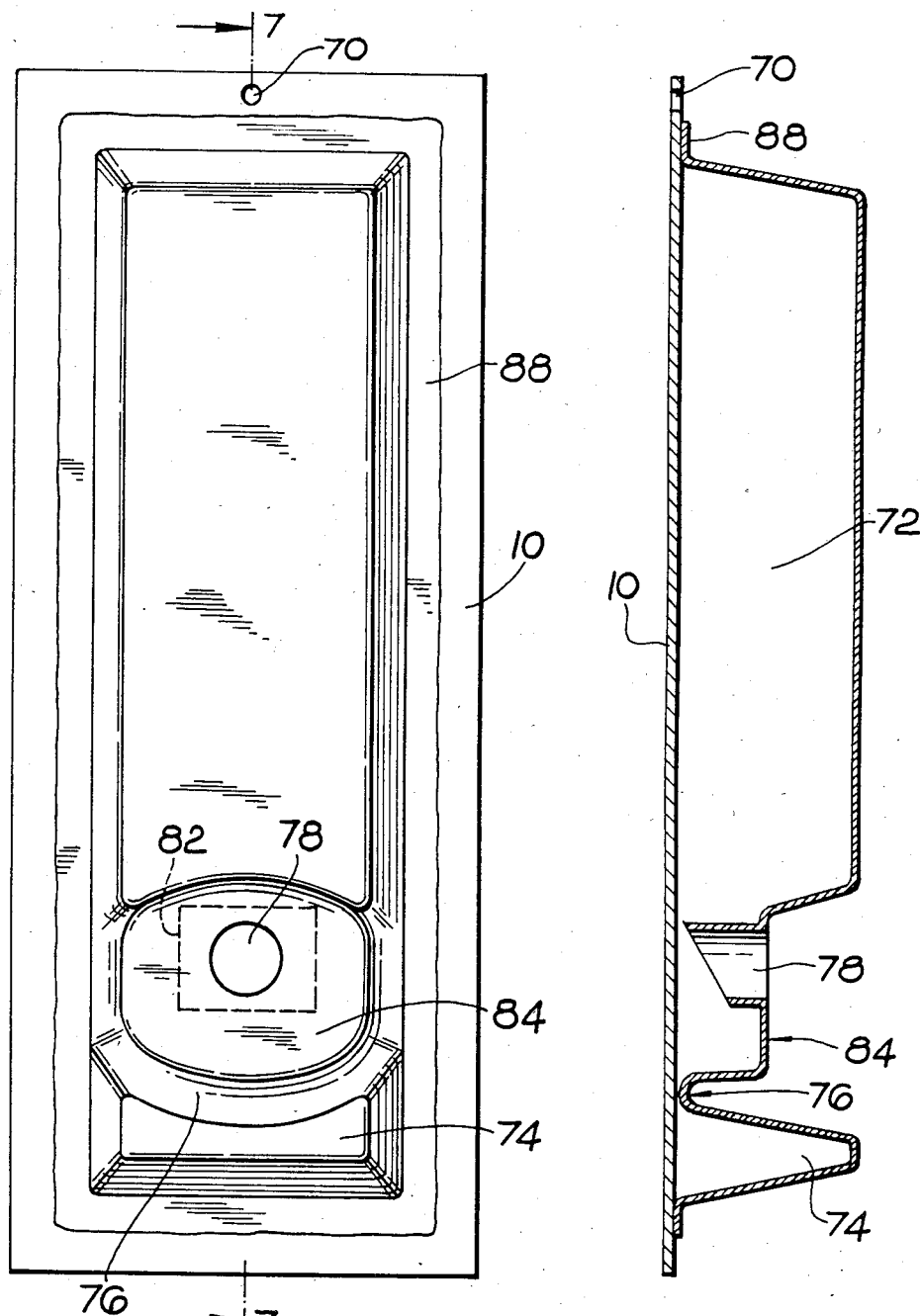
FIG. 5 is a front elevation of a second form of the invention.
FIG. 6 is a section taken on the line 7—7 of FIG. 5.

Turning now to the embodiment shown in FIGS. 5 and 6 the feeder is to be suspended from the aperture 70 and the blister pack provides a main storage area for the food 72. The blister pack provides a perch 74 which is sealed off from the food storage compartment 72 in the area indicated by the reference numeral 76. Between the perch and the food storage area, is an access port 78 which may be a plain hole, an area to be apertured (as explained with reference to FIGS. 1 to 4) or may be formed as an integral internally projecting tube with a bevelled end as shown in FIG. 6, intending to be sealed and closed during storage and transit, for example by a patch of adhesive tape shown in broken line with the reference 82 FIG. 5. The inner end of the tube is bevelled as shown in FIG. 6 so that when the feeder is hanging from the eye 70, food falling downwardly in the container, as food is extracted by birds, will not fall through the access port, but will be available for the birds through that port.

The port 78 extends from a recessed area 84 so that a bird standing on the perch 74 will obtain some shelter from the overhanging food storage compartment 72. The vertical dimension of the recessed area 84 may be for example about 6 or 7 cms for this purpose, with the access port at the upper end of the recessed area.

FIG. 6 shows the blister pack with a peripheral flange 88 secured as by adhesive or heat sealing to the card or the like 10, but any convenient construction to provide a closed container can be utilised.

I claim:

1. A disposable pack intended for use as a combination bird feeder and shelter, comprising a blister pack secured to a backing, said blister pack including an upper main portion having a substantially vertical outward wall and a substantially horizontal bottom wall portion containing bird food, and a recessed lower portion into which bird food is free to flow by gravity from the upper main portion, and a perch arranged below said lower portion, said lower portion being in the form of a recess containing a port which provides access for a bird to bird food in said substantially horizontal bottom wall portion extending outward to form the upper side of said recess and sheltering in said recess a bird obtaining bird food from said port.

2. A disposable pack as claimed in claim 1 wherein the perch is part of the blister pack.

3. A disposable pack as claimed in claim 2 wherein the perch comprises a pair of stiles with a rung extending therebetween, and the backing provides a support comprising flanges of the backing creased to be folded to extend generally at right angles to the backing and underlie the perch.

* * * * *